(12) United States Patent
Cook et al.

(10) Patent No.: US 9,128,687 B2
(45) Date of Patent: Sep. 8, 2015

(54) WIRELESS DESKTOP IT ENVIRONMENT

(75) Inventors: Nigel P. Cook, El Cajon, CA (US);
Lukas Sieber, Olten (CH); Hanspeter Widmer, Wohlenschwil (CH)

(73) Assignee: QUALCOMM Incorporated, San Diego, CA (US)

( * ) Notice: Subject to any disclaimer, the term of this patent is extended or adjusted under 35 U.S.C. 154(b) by 1130 days.

(21) Appl. No.: 12/351,845

(22) Filed: Jan. 11, 2009

(65) Prior Publication Data

US 2009/0212636 A1 Aug. 27, 2009

Related U.S. Application Data

(60) Provisional application No. 61/020,363, filed on Jan. 10, 2008.

(51) Int. Cl.
*H02J 17/00* (2006.01)
*G06F 1/26* (2006.01)

(52) U.S. Cl.
CPC ........ *G06F 1/26* (2013.01); *G06F 1/266* (2013.01); *H02J 17/00* (2013.01)

(58) Field of Classification Search
CPC ....................................................... H02J 17/00
USPC ........................................... 307/104; 320/108
See application file for complete search history.

(56) References Cited

U.S. PATENT DOCUMENTS

| 5,455,467 A * | 10/1995 | Young et al. ................. 307/104 |
| 6,803,744 B1 * | 10/2004 | Sabo ............................. 307/104 |
| 7,741,734 B2 | 6/2010 | Joannopoulos et al. |
| 7,825,543 B2 | 11/2010 | Karalis et al. |
| 2004/0130916 A1 * | 7/2004 | Baarman .................... 363/21.02 |
| 2005/0151511 A1 * | 7/2005 | Chary ........................... 320/127 |
| 2007/0222542 A1 | 9/2007 | Joannopoulos |
| 2007/0296393 A1 * | 12/2007 | Malpas et al. ................ 323/355 |

FOREIGN PATENT DOCUMENTS

WO WO 2004015885 A1 * 2/2004

OTHER PUBLICATIONS

"Wireless Non-Radiative Energy Transfer", MIT paper, publication and date unknown, believed to be 2007.
"Efficient wireless non-radiative mid-range energy transfer", MITpaper, publication and date unknown, believed to be 2007.
"Wireless Power Transfer via Strongly Coupled Magnetic Resonances", Kurs et al, Science Express, Jun. 7, 2007.
"Wireless Power Transfer via Strongly Coupled Magnetic Resonances", Kurs et al, scimag.org, Jul. 6, 2007.

* cited by examiner

*Primary Examiner* — Fritz M Fleming
(74) *Attorney, Agent, or Firm* — Knobbe Martens Olson & Bear LLP

(57) ABSTRACT

A wireless powered desktop system.

32 Claims, 1 Drawing Sheet

WIRELESS DESKTOP IT ENVIRONMENT

This application claims priority from provisional application No. 61/020,363, filed Jan. 10, 2008, the entire contents of which disclosure is herewith incorporated by reference.

BACKGROUND

Previous applications by Nigel Power LLC have described a wireless powering and/or charging system using a transmitter that sends a magnetic signal with a substantially unmodulated carrier. A receiver extracts energy from the radiated field of the transmitter. The energy that is extracted can be rectified and used to power a load or charge a battery.

It is desirable to transfer electrical energy from a source to a destination without the use of wires to guide the electromagnetic fields. A difficulty of previous attempts has been low efficiency together with an inadequate amount of delivered power.

Our previous applications and provisional applications, including, but not limited to, U.S. patent application Ser. No. 12/018,069, filed Jan. 22, 2008, entitled "Wireless Apparatus and Methods", the entire contents of the disclosure of which is herewith incorporated by reference, describe wireless transfer of power.

The system can use transmit and receiving antennas that are preferably resonant antennas, which are substantially resonant, e.g., within 10% of resonance, 15% of resonance, or 20% of resonance. The antenna(s) are preferably of a small size to allow it to fit into a mobile, handheld device where the available space for the antenna may be limited. An efficient power transfer may be carried out between two antennas by storing energy in the near field of the transmitting antenna, rather than sending the energy into free space in the form of a travelling electromagnetic wave. Antennas with high quality factors can be used. Two high-Q antennas are placed such that they react similarly to a loosely coupled transformer, with one antenna inducing power into the other. The antennas preferably have Qs that are greater than 1000.

SUMMARY

The present application describes a wireless desktop for wireless power transfer.

Embodiments describe a power transmitter that can be formed within the base of a computer monitor. Other embodiments describe parasitic antennas formed in desktop components.

DETAILED DESCRIPTION

A typical computer desktop has a number of parts which are interconnected by wires. For example, the keyboard, mouse, etc. may require wired connections. Modern keyboard and mouse may be controlled using a wireless protocol such as infrared or Bluetooth. However, the keyboard and mouse etc. still require a source of power. They use batteries or rechargeable batteries to avoid the wires. The user therefore has one extra task to worry about: the task of maintaining those batteries.

A user also can have a phone on their desk, and that following also requires a power source for its charging. For example, the phone can be a wireless telephone as part of a home phone system, or can be a cellular phone. Both of them require sources of power in order to operate and/or charge the batteries.

Overall, the desktop itself becomes a mass of wires.

Figure 1:
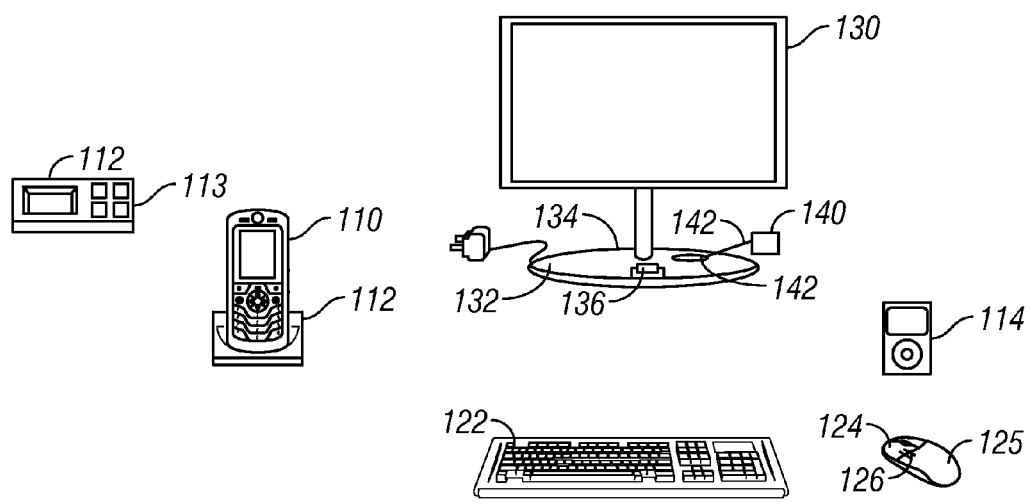
FIG. 1 shows an embodiment of a wirelessly-powered desktop.

FIG. 1 shows an embodiment of an wireless desktop IT environment. Both handheld communications terminals, e.g., a portable phone 110 and a personal digital assistants 112, media player such as IPOD 114; and IT peripheral devices such as keyboard 122, mouse 124 are powered or recharged from a central power source via a wireless energy transfer.

A preferred technique for wireless energy transfer is based on coupled magnetic resonance using magnetic field antennas (e.g., loops and coils) operating either in the LF (eg, 135 Khz) or HF (eg, 13.56 Mhz) frequency range.

One embodiment uses an electrical coil as a transmitter for wireless power. The efficiency of the wireless power transfer may be proportional to the size of that coil. Moreover, the coil is typically round.

In an embodiment, a computer screen 130 includes a computer base 132, but more generally, any desktop component may have an area into which the antenna can be integrated. The base is typically large enough to accommodate the screen standing upright, and keep the screen from falling over. In the embodiment, the geometric area defined by the computer base 132 provides an area into which the main coil shown as 134 is located. This coil may be a circular wire loop 134, with a capacitive part 136. The LC constant of the loop may be tuned according to the desired frequency.

The power supply for the display 130 is shown as 140. This may produce both the power supply for the screen, and may also produce a a magnetic power output at a frequency that is resonant to the frequency of the antenna. That separate output shown as 142 which is connected to the antenna 134/136. In one embodiment, the power output 142 may be connected to a coupling loop 143 which couples the power to the main antenna loop 134/136.

Since the round wire loop always stays in precisely the same orientation, the polarization of the magnetic field is produced can be consistent. For example, this may generate an essentially vertically polarized magnetic field.

While the above has described the antenna being integrated into the base of the desktop, the antenna could also or alternatively be integrated around the perimeter of a flat screen 130. For example, integrating the second antenna around the flat screen perimeter 130 may provide the ability to transmit power which has an orthogonal orientation to the magnetic energy transmitted at 134/136. Either or both of these can be used.

Each of the desktop devices includes a power receiver of a type that can receive power from the power transmitter. These may be as discussed in our co-pending applications. For example, the power receiver may be integrated into the device itself. For example personal device 112 may include an integrated power receiver as part of the actual device. As an alternative, a stand for a device can be used. For example, the wireless mouse 124 may be associated with a stand 125 that has electrical contacts 126 that connect to the mouse. The stand 125 includes a wireless receiver that wirelessly receives the power from the transmitter 134.

The wireless receivers can repeat the power. For example, the wireless receiver 112 can be a parasitic antenna of the type described in our co-pending application Ser. No. 12/323,479, filed Nov. 26, 2008, the entire disclosure of which is herewith incorporated by reference.

Figure 2:
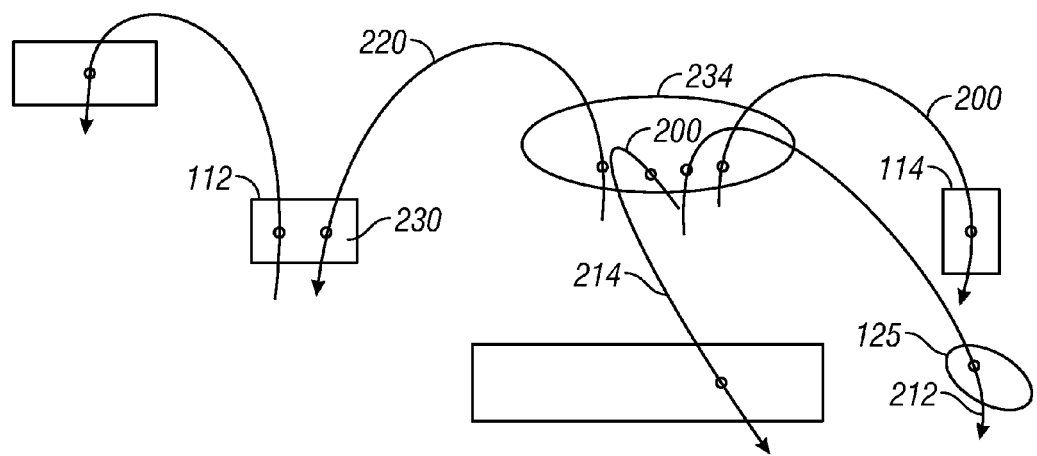
FIG. 2 shows a flow of magnetic power.

FIG. 2 shows an operation of coplanar magnetic field coupling between items on the desktops. The transmit antenna is shown as 134. In the embodiment of FIG. 1, this transmit antenna can be integrated into the foot of the screen used for the personal computer. The transmit antenna produces a magnetic field shown as 200, which extends in all directions. Some parts of this magnetic field, such as 210, are coupled directly to a device that has a receiver therein. For example, 210 couples to the music player 114 which is wireless enabled. 212 couples to the pad 125 on which the wireless mouse is charge. Other parts such as 214 coupled to the wireless keyboard. Yet another part 220 may coupled to a power a parasitic antenna 230 which itself can coupled to other devices. The parasitic antenna 230 can itself act as a charging station, for example the parasitic antenna 230 can be incorporated in the device 112.

Although only a few embodiments have been disclosed in detail above, other embodiments are possible and the inventors intend these to be encompassed within this specification. The specification describes specific examples to accomplish~more general goal that may be accomplished in another way. This disclosure is intended to be exemplary, and the claims are intended to cover any modification or alternative which might be predictable to a person having ordinary skill in the art. For example, other sizes, materials and connections can be used. Other structures can be used to receive the magnetic field. In general, an electric field can be used in place of the magnetic field, as the primary coupling mechanism. Other kinds of antennas can be used. The above has described how the base can be round, but the base can also be rectangular, in which case the antenna can be either round or rectangular. Other shapes of the antennas can also be used.

Also, the inventors intend that only those claims which use the-words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A wireless power transmitting system, comprising:
    a computer display configured to be coupled to a power source;
    a base for holding the computer display, the base including
        a foot configured to be placed on a surface, the base having an area to hold an inductive loop, the inductive loop disposed in the foot with an orientation parallel to the surface, and
        an upright member extending from the foot, the upright member having a first end and a second end, the first end of the upright member coupled to the foot and the second end of the upright member coupled to the computer display; and
    a LC circuit disposed within the foot of the base, the LC circuit configured to receive power from the power source, the LC circuit including the inductive loop and a capacitor corresponding to an associated LC value of the LC circuit, the LC circuit configured to generate a magnetic power transfer field at a resonant frequency based on the LC value associated with the LC circuit.

2. The system as in claim 1, wherein said base has a round outer shape, and said inductive loop is coaxial to said round outer shape.

3. The system as in claim 1 further comprising a charging pad, the charging pad separate from the computer display, the charging pad tuned to be substantially resonant with the LC circuit.

4. The system as in claim 3, wherein said charging pad comprises electrical contacts which electrically couple to an attached item.

5. The system as in claim 3, wherein said charging pad is parasitic.

6. The system as in claim 5, wherein said charging pad has a connection for an external device.

7. The system as in claim 1, wherein said base of said computer display has a position which is unchanged during operation.

8. The system as in claim 1, wherein a polarization of said magnetic power transfer field is unchanged during operation of the desktop device.

9. The system as in claim 1, wherein the LC circuit further comprises a second inductive loop with a plane of the second inductive loop having an orientation which is perpendicular to the surface.

10. The system as in claim 9, wherein the second inductive loop is disposed around a perimeter of a flat screen of the computer display.

11. A wireless power transmitting system, comprising:
    a computer display that is substantially unmoved during operation, the computer display configured to be coupled to a power source;
    a base for holding the computer display, the base including
        a foot configured to be placed on a surface, the base having an area to hold an inductive loop, the inductive loop disposed in the foot with an orientation parallel to the surface, and
        an upright member extending from the foot, the upright member having a first end and a second end, the first end of the upright member coupled to the foot and the second end of the upright member coupled to the computer display; and
    a LC circuit disposed within the foot of the base, the LC circuit configured to receive power from the power source, the LC circuit including the inductive loop and a capacitor corresponding to an associated LC value of the LC circuit, the LC circuit being configured to generate a magnetic power transfer field at a resonant frequency based on the LC value associated with the LC circuit.

12. The system as in claim 11, wherein the power source comprises a magnetic power source configured to provide power to the computer display, and wherein the magnetic power transfer field comprises a substantially magnetic field.

13. The system as in claim 12, wherein the LC circuit is configured to generate the magnetic power transfer field to include a substantially constant polarization.

14. The system as in claim 11, wherein said inductive loop of said LC circuit is integrated as part of said base.

15. The system as in claim 14, wherein said base has a round outer shape, and said inductive loop is coaxial to said round outer shape.

16. The system as in claim 11 further comprising a separate charging pad, which is tuned to be substantially resonant with the LC circuit.

17. The system as in claim 16, wherein said charging pad comprises electrical contacts coupled to an attached item.

18. A method, comprising:
    receiving, with a LC circuit, power from a power source;
    generating a magnetic power transfer field via the LC circuit based on the received voltage signal, the magnetic power transfer field having a resonant frequency and being configured to provide electrical power wirelessly to desktop items, the desktop items being physically separate from the LC circuit, the LC circuit including an inductive loop and a capacitor corresponding to an associated LC value of the LC circuit, the LC circuit disposed in a foot of a base configured to be placed on a surface, the inductive loop parallel to the surface, the base including an upright member extending from the foot having a first end coupled to the base and a second end coupled to a computer display, and the magnetic power transfer field having a resonant frequency based on an LC value associated with the LC circuit.

19. The method as in claim 18, further comprising operating said inductive loop with a plane of the loop having an orientation which is parallel to a plane of a desktop.

20. The method as in claim 19 further comprising operating a second inductive loop with a plane of the second inductive loop having an orientation which is perpendicular to the plane of the desktop.

21. The method as in claim 18, wherein said base has a round outer circumference, and said inductive loop is coaxial to said round outer circumference.

22. The method as in claim 18 further comprising a separate charging pad, which is tuned to be substantially resonant with the LC circuit.

23. The method as in claim 22, wherein said charging pad has electrical contacts which couple to an attached item.

24. The method as in claim 22, wherein said charging pad is parasitic.

25. The method as in claim 24, wherein said charging pad is parasitic and includes a connection for an external device.

26. The method as in claim 18, further comprising maintaining said base of said computer display in a position which is fixed during operation.

27. A method, comprising:
receiving, with a LC circuit, power from a power source;
generating a magnetic power transfer field via the LC circuit based on the received power, the magnetic power transfer field having a resonant frequency and being configured to provide electrical power wirelessly to a plurality of desktop items, the plurality of desktop items being physically separate from the LC circuit, the LC circuit including an inductive loop and a capacitor corresponding to an associated LC value of the LC circuit, the LC circuit disposed in a foot of a base configured to be placed on a surface, the inductive loop parallel to the surface, the base including an upright member extending from the foot having a first end coupled to the base and a second end coupled to a computer display, and the magnetic power transfer field having a resonant frequency based on an LC value associated with the LC circuit.

28. The method as in claim 27, wherein said operating comprises continuously transmitting said electrical power.

29. The method of claim 27, wherein the magnetic power transfer field is configured to transmit electrical power at a polarization parallel to a surface of a desktop that supports the computer display.

30. An apparatus, comprising:
means for receiving power from a power source;
means for generating a magnetic power transfer field based on the received power, the magnetic power transfer field having a resonant frequency and being configured to provide electrical power wirelessly to desktop items, the desktop items being physically separate from the means for generating the magnetic power transfer field, the means for generating the magnetic power transfer field disposed within the foot of a base, the base configured to be placed on a surface, the base having an area to hold an inductive loop, the inductive loop disposed in a foot of a base configured to be placed on a surface, the inductive loop parallel to the surface, the base including an upright member extending from the foot having a first end coupled to the base and a second end coupled to a computer display.

31. The apparatus as in claim 30, wherein the means for generating the magnetic power transfer field comprises a LC circuit including the inductive loop and a capacitor.

32. The apparatus as in claim 30, wherein the magnetic power transfer field is configured to transmit electrical power at a polarization parallel to a surface of a desktop that supports the computer display.

* * * * *